United States Patent [19]

Dzurkovich

[11] 4,330,917

[45] May 25, 1982

[54] SEAL EXTRACTING TOOL

[76] Inventor: Damon Dzurkovich, 1202 N. Sixth St., Reading, Pa. 19601

[21] Appl. No.: 132,277

[22] Filed: Mar. 20, 1980

[51] Int. Cl.[3] .......... B23P 19/04

[52] U.S. Cl. .......... 29/235; 29/240; 29/264; 29/278

[58] Field of Search ....... 29/278, 280, 235, 240-240.5, 29/264, 270, 271

[56] References Cited

U.S. PATENT DOCUMENTS

| | | | |
|---|---|---|---|
| 1,458,076 | 6/1923 | Potts | 29/264 X |
| 2,486,084 | 10/1949 | Webster | 29/280 |
| 3,393,439 | 7/1968 | Shriver | 29/235 |
| 3,602,976 | 9/1971 | Thurston et al. | 29/240.5 |

*Primary Examiner*—Robert C. Watson
*Attorney, Agent, or Firm*—Ruth Moyerman

[57] ABSTRACT

A hand-held tool to use in extracting ring seats from housings such as small engine carburetor needle inlet valves is disclosed. The tool has a generally cylindrical handle means. From one end of the handle means a helical or threaded arm projects, ending in a tip. By inserting the extracting arm into the housing, pressing the arm end opposite the seal and turning the tool, the seal threads itself on and up the arm. Withdrawing the tool with the threaded seal on it from the housing thus removes the seal. A further embodiment combines with the foregoing a tamping member which projects from the other end of the handle means. The tamper, with its tip, aids in inserting a fresh seal in the housing.

2 Claims, 4 Drawing Figures

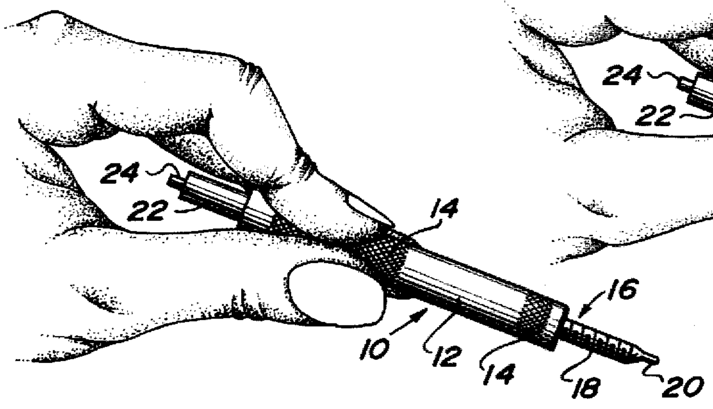
FIG. 1
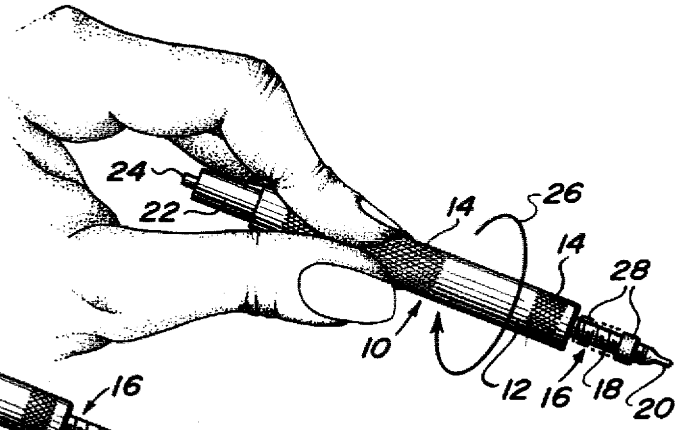
FIG. 2
FIG. 3
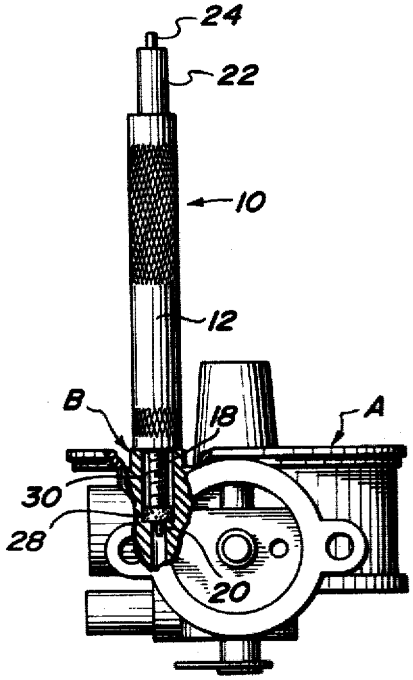
FIG. 4
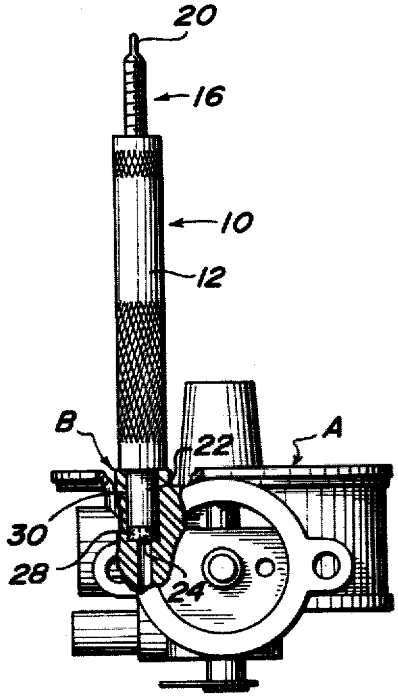

SEAL EXTRACTING TOOL

BACKGROUND OF THE INVENTION

1. Field of the Invention

This invention relates to pushing and pulling implements and more particularly to a tool for extracting seats or seals and the like.

2. Description of the Prior Art

In both the manufacture and in the use of a variety of apparatus there is a need to maintain a good seal between the parts. For example, in carburetors, particularly of the small, four-stroke cycle engine type, an O-ring seal or seat is used as a seal in the housing for the inlet needle. As the seal or seat becomes worn, it becomes necessary to replace it. It has been customary in the past to disassemble and remove the carburetor to achieve this seal replacement. A common practice after disassembling the engine and removing the carburetor is to place an air hose to the inlet fitting and allow a short blast of air to pass through, thereby blowing out the seal or seat. In some instances the seat is removed by inserting a hooked wire into the cylindrical housing and trying to hook the seat and pull it out.

Thus, it is apparent that to remove and replace the seats in carburetors and the like is no simple task and should this repair become necessary where there is no air available for air blasting, this standard procedure is simply unavailable. Furthermore, the use of hooks to extract seals is a poor practice because of the likelihood that the housing will be scratched and damaged. Lastly, it should be noted that not everyone has the expertise necessary to disassemble an engine to get to the carburetor and then to correctly reassemble the parts.

There is therefore a great need for an ability to extract used seals such as O-rings and seats in apparatus such as generators, pump housings, lawn mowers and other types of machinery.

There is also a heretofore unsatisfied need to provide an ability to extract these seals by the use of a simple, inexpensive and easy to use hand-held tool.

SUMMARY OF THE INVENTION

The aforesaid prior art problems are overcome by the seal extracting tool of this invention.

This invention contemplates a small, hand-held tool in which an elongated handle is provided. The handle is intended to be grasped between the thumb and the forefinger of one hand. From one end of this preferably, generally, cylindrical handle a threaded arm extends. This threaded, or helical, arm is small enough to be inserted into the housing into which the seal is located. The arm ends in a tip, preferably conical or needlelike. The tip allows the user to guide the tool by placing the tip through the O-ring or seal so that the arm end rests against the seal. By pressing against the seal while hand rotating the tool, the seal is urged upward, threaded along the helical arm, moving toward the handle. The tool is then removed, lifting out the seal with it.

A second, optional but very helpful, part of the tool contemplates a tamping portion to enable the insertion and holding of the new seal. The tamping portion extends, in the preferred embodiment, outward from the other end of the handle means. The part itself is cylindrical and of a size and length to enable its insertion within the carburetor housing. In use, the operator applies the new seal or seat onto the insertion end of the tool. The seal inserting or tamping end of the tool is then inserted into the housing to urge the seal downward against the housing where it is to rest.

The tamping end may also terminate in a tip. The tip holds and guides the replacement of O-rings or the like open-centered seals in the housing.

It is therefore an object of this invention to provide, as a tool, a means for extracting ring seals and the like to enable their replacement within a housing.

It is a further object of this invention to provide the aforesaid means as a small, compact and hand-held tool.

It is yet another object of this invention to provide the aforesaid tool as an inexpensive, simple tool which is both readily utilizable by a craftsman of only normal dexterity but which is also versatile in its application potential.

These and other objects will be more readily ascertainable to one skilled in the art from a consideration of the figures and following description and exemplary embodiments.

BRIEF DESCRIPTION OF THE DRAWINGS

FIG. 1 shows a preferred embodiment of the tool of this invention in the hand of a user.

FIG. 2 also shows the same embodiment as FIG. 1 but includes a seal mounted on the helix or threads and indicates the clockwise turning motion utilized in the extraction.

FIG. 3 shows a side elevation of the tool of this invention in use as an extractor.

FIG. 4 shows a side elevation of the tool of this invention in use as a tamper.

DESCRIPTION OF THE PREFERRED EMBODIMENT(S)

Referring now to the drawing and more particularly to FIG. 1, the tool of this invention, generally 10, is shown held between the thumb and the forefinger of the hand as it would normally be held in use. Tool 10 includes handle means 12. Handle means 12, in this preferred embodiment, is shown as generally cylindrical and includes knurling 14. The purpose of knurling 14 is merely to improve the grip of the user on the tool. Handle means 12 terminates in platform 15. Eminating or projecting from one end of handle 12 extracting arm 16 is shown. Extracting arm 16 includes helix or threads 18. Helix 18 terminates in tip 20 illustrated in the figure as a nipple shape tip. Projecting from the other end of handle means 12 tamping member 22 is shown. Tamping member 22 is also generally cylindrical but smaller in diameter than handle 12. Tamping member 22 terminates in cylindrical shaped tip 24.

Referring now to FIG. 2, the same tool 10 is shown again. In FIG. 2, arrow 26 indicates the clockwise fashion in whcih the tool will be turned in use to cause the extraction of seal 28, also shown in FIG. 2. In regard to seal 28, it should be noted that the seal is shown both in elevation and in phantom to indicate the direction in which the seal moves upward on the helix of the arm during the extracting process. The clockwise turning for extraction is predetermined in that it corresponds to a clockwise or right hand thread of the helix.

Referring now to FIG. 3, the article of manufacture of this invention is shown in its intended use. In FIG. 3, "A" generally indicates a carburetor of a small, for example, four stroke cycle engine. Part of carburetor A is shown in cutaway section B to enable better observation of the tool in use. In cutaway B, housing 30 is shown including seal 28 mounted on a shouldered section of the housing. The housing section illustrated is the inlet needle and seat of the carburetor (the inlet needle itself is not shown in this illustration). In the course of the use of the carburetor, seal 28 becomes worn, necessitating its removal and replacement. To facilitate this replacement, tool 10 is inserted in the housing as shown in FIG. 3 with tip 20 passing through the center of O-ring seal 28, allowing platform 15 to rest on the seal. By rotating tool 10 in a clockwise fashion (clockwise because of the right hand threading of extracting arm 16), seal 28 will, during the turning process, wind its way upward on extracting arm 16 toward handle 12. When seal 28 is securely bottomed on tool 10, the tool may be removed from the carburetor, carrying the seal with it.

Referring now to FIG. 4, the same carburetor A is again shown with the same cutaway section B visible. In FIG. 4, tool 10 is now in the reversed position (or upside down position) and is being used to assist in the insertion of a new seal 28. Tool 10 is inserted into housing 30 with tamping member 22 being used to press seal 28 into the seated position in the housing. Tip 24, which extends through the center of the O-ring seal 28, aids in positioning and centering the seal.

There are many variations which may be practiced within the scope of my invention. For example, while handle means 12 is shown as cylindrical in shape, this is merely a convenience and other dimensions or shapes which are easily gripped between the fingers may be substituted. Likewise, while extracting arm 16 preferably projects from the end handle 12 to give the tool a linear dimension, this is optional. What is important is that extracting arm 16 have sufficient dimensions to allow it to be inserted within the housing for which it is intended. Thus, in the illustration shown utilizing a small engine carburetor, the linear dimension of the tool is important to prevent it from encountering other parts of the carburetor while it is being held and turned.

Tip 20, while not absolutely necessary, greatly enhances the utility of the tool by enabling extracting arm 16 to be properly centered. The shape or dimensions of tip 20 are shown as nipple shaped but conical or a needle tip are likewise useful.

Tamping member 22 is also not necessary but greatly aids the versatility of the tool. Tamping tip 24 is not critical to the use of tamping member 22, but again aids in the holding and positioning and aligning of the newly inserted seal.

The knurling shown as optional is beneficial for an all metal tool. A rubberized coating of handle means 12 would also suffice.

The tool is preferably manufactured of metal, for example, aluminum or steel but the material of construction is not critical as long as the material selected is durable and allows the tool to be utilized in its intended fashion.

Having now illustrated my invention it is not my intention that such illustration be limiting to the invention, but that the invention be limited only by a reasonable interpretation of the apended claims.

What is claimed is:

1. As an article of manufacture, a tool for extracting ring seals resting on a shoulder within a sleeve-type housing comprising:

(a) generally elongated, cylindrical handle means of a size to enable the user of the tool to grasp the handle means between the thumb and fingers of one hand;

(b) a generally elongated, cylindrical, helical extracting arm terminating at its one end in a generally flat platform, said platform forming an extension of one end of said handle means, said arm terminating at its other end in a flat nipple tip, said arm having dimensions sufficient to enable its insertion into said housing for substantially the housing full length, said tip intended to extend through a ring seal center to guide the positioning and centering of said arm's helix whereby, when said platform is pressed against said housing shoulder while said handle means is rotated, said seal is transferred from said housing, urged upward from said arm tip end toward said handle means, spiraling onto said arm and guided in its movement by said helix's threads; and, (c) a generally cylindrical flat-ended tamping member attached at one of its flat ends to the other end of said handle means, and terminating at its other end in a nipple, said tamping member having a lesser diameter but generally the same or greater length than said sleeve type housing so that, after a seal is inserted into said sleeve housing, said tamping member may be inserted thereafter and, utilizing said nipple as a guide, to urge said seal downward, said tamping member end causes said seal to be positioned snuggly against said housing shoulder.

2. The article of manufacture according to claim 1 wherein said handle means is, at least in part, knurled to facilitate the user's grip.

* * * * *